(12) United States Patent
Lilot et al.

(10) Patent No.: US 8,655,723 B1
(45) Date of Patent: Feb. 18, 2014

(54) SYSTEM AND METHOD FOR PROVIDING A DATE RANGE AGGREGATE TO REDUCE A NUMBER OF LOOKUPS FOR WEB ANALYTICS

(75) Inventors: Jean-Christophe Emmanuel Lilot, Mountain View, CA (US); Nicolas Thakis Weber, Santa Cruz, CA (US); Oscar del Pozo Triscon, Palo Alto, CA (US)

(73) Assignee: Google Inc., Mountain View, CA (US)

(*) Notice: Subject to any disclaimer, the term of this patent is extended or adjusted under 35 U.S.C. 154(b) by 173 days.

(21) Appl. No.: 13/187,484

(22) Filed: Jul. 20, 2011

(51) Int. Cl.
*G06Q 30/00* (2012.01)
*G06Q 10/00* (2012.01)

(52) U.S. Cl.
USPC ............. 705/14.45; 705/14.41; 705/14.43; 705/7.11; 705/7.29

(58) Field of Classification Search
USPC ..................................... 705/14.45
See application file for complete search history.

(56) References Cited

U.S. PATENT DOCUMENTS

2002/0116249 A1* 8/2002 Ellinger et al. ............ 705/10
2009/0327070 A1* 12/2009 Etchegoyen ............ 705/14.45

OTHER PUBLICATIONS

Goncalves et al., "Human dynamics revealed through Web analytics", Physical Review E 78.2 (2008): 026123.*

* cited by examiner

*Primary Examiner* — John G Weiss
*Assistant Examiner* — Scott C Anderson
(74) *Attorney, Agent, or Firm* — Foley and Lardner LLP; John D. Lanza

(57) ABSTRACT

Disclosed is a computer implemented method of determining an aggregated web analytics value. A first data storage medium stores a sequence of episodic values, each associated with a respective time interval. A second data storage medium stores a sequence of aggregate values, each aggregating an equal number of the episodic values. Further aggregates are stored and provided in a like manner, until an additional sequence of higher level aggregate values cannot be created using the same base number. When a request for an aggregate value over a range of episodic values is received, the system queries the storage mediums in a parallel operation, retrieving as little aggregated values and episodic values needed to compute the requested value.

25 Claims, 5 Drawing Sheets

SYSTEM AND METHOD FOR PROVIDING A DATE RANGE AGGREGATE TO REDUCE A NUMBER OF LOOKUPS FOR WEB ANALYTICS

TECHNICAL FIELD

The subject technology relates generally to server-client systems, namely, web analytics systems.

BACKGROUND

A web server is a computer that hosts web pages or websites that can be accessed over a network, such as the Internet. The web server may also generate analytical data related to user visits and linkings to the web server's web pages or websites. Exemplary analytical data includes the number of visitors, navigation clicks, traffic patterns, originating or linking domains, and other related actions a visitor may undertake when visiting the web server.

Web analytics may inform an owner of a website on how visitors interacted with the website. With this understanding, the owner can implement changes to improve visitor experience and/or increase revenue generation. For example, in response to analytical data, the owner may shift marketing resources, modify advertising campaigns, and/or identify website bottlenecks that impede visitor experience.

SUMMARY

A computer implemented method of determining an aggregated web analytics value is disclosed. In one aspect, the method includes storing in a first data storage medium a series of episodic values, each of the episodic values being associated with a respective predefined time interval, and storing in a second data storage medium a sequence of first level aggregate values, each of the first level aggregate values aggregating a respective set of consecutive episodic values. The method further includes, on receiving a request to provide an aggregated web analytics value from a selected range of predefined time intervals, determining a set of one or more episodic values within the selected range and a set of one or more first level aggregate values within the selected range, wherein the determined set of one or more episodic values is not included in the determined set of one or more first level aggregate values, and generating the aggregated web analytics value by retrieving and summing the determined set of one or more episodic values from the first data storage medium and the determined set of one or more first level aggregate values from the second data storage medium. In some aspects, each of the episodic values includes a count of advertisement impressions generated for an online ad campaign on one or more websites. In a further aspect, a machine-readable storage medium is disclosed, the machine-readable storage medium including stored machine-executable instructions for performing the previously described method of determining an aggregated web analytics value.

A system for determining an aggregated web analytics value is also disclosed. In one aspect, the system includes a first and a second data storage medium, and one or more processors operable to store in the first data storage medium a series of episodic values, wherein each of the episodic values is associated with a respective predefined time interval and includes a count of advertisement impressions generated for an online ad campaign on one or more websites, and operable to store in the second data storage medium a sequence of first level aggregate values, each of the first level aggregate values aggregating a respective set of consecutive episodic values, wherein each set of consecutive episodic values is equal in number. The one or more processors are further operable to, on receiving a request to provide an aggregated web analytics value from a selected range of predefined time intervals, determine a set of one or more episodic values and a set of one or more first level aggregate values within the selected range. The determined set of one or more episodic values may not be included in the determined set of one or more first level aggregate values. The one or more processors are further operable to generate the aggregated web analytics value by retrieving and summing the set of one or more episodic values from the first data storage medium and the set of one or more first level aggregate values from the second data storage medium.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The subject technology provides a computer implemented system and method for efficient calculation and reporting of analytics data. Analytics data is generally collected at a certain level of granularity. For example, data may be collected for an online marketing campaign each day of the campaign. A marketing administrator may wish to view a report displaying a total number of advertisement impressions generated for an ad campaign on one or more websites, and change the report instantaneously based on selected date ranges. The range of the requested data reported may change from days to weeks, or from months to years, or portions thereof. When summing the number of impressions for each of N selected days in a range of days, current reporting systems request a count for each day in the range and sum the total, requiring an execution time having a growth rate of O(N). The growth rate is compounded by network (for example, data transfer) and database latencies. Execution time may consequently become problematic when results are expected to be instantaneous (for example, at the click of a mouse). Thus, there is a need for a system that has the ability to efficiently calculate analytics data (for example, a total number of advertisement impressions) while significantly reducing the growth rate of the calculation.

Figure 1:
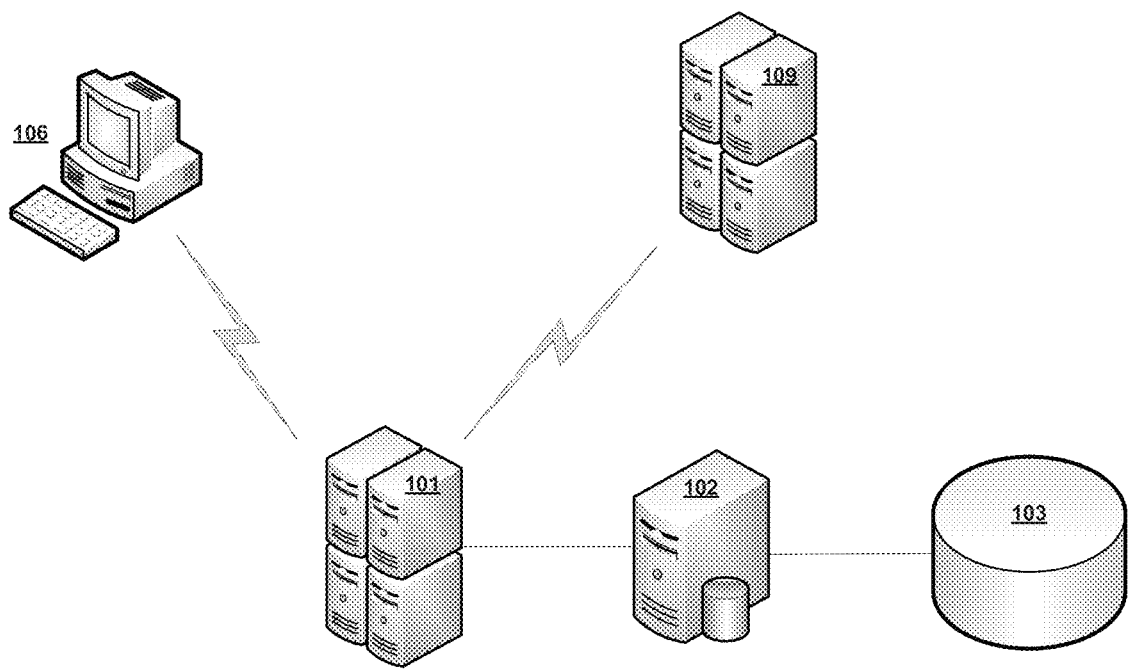
FIG. 1 is a diagram illustrating server and database components of a web analytics system according to one aspect of the subject technology.

FIG. 1 is a diagram illustrating server and database components of a web analytics system according to one aspect of the subject technology. To achieve a solution to the previously described problem, a system compatible with the subject technology includes one or more local servers 101 and a database server 102 for the storing and reporting of analytics data in a database 103. In one example, a user may create an advertisement and associate it with a marketing campaign by which the advertisement will be displayed over a period of time (for example, weeks or months) on one or more third party websites hosted by one or more remote servers 109. Servers 101 may collect analytics data from servers 109 and communicate with database server 102 to store the analytics data in database 103. In one aspect, the analytics data may include an episodic count of advertisement impressions (for example, a daily impression count). In this regard, the count for each consecutive episode may be stored in a first data storage (for example, in a database table, data file, memory medium, or the like). In one aspect, each episode may be consecutively indexed by an increasing integer value. For example, wherein an episode represents a single day, the increasing integer value may be a number of days since Jan. 1, 1970.

As analytics data is stored, a server 101 may be configured to determine and store pre computed aggregates of different sizes. Each aggregate may include a sum of values collected from a set of consecutive episodes. In this manner, subsequent sets of episodes (for example, every three days) may be aggregated by a series of aggregates (for example, first level aggregates). Each aggregate may be stored in a second data storage (for example, on a different memory medium, database table, or the like) and indexed. For example, where each episode is indexed by an integer value, the integer value associated with the first episode of the aggregated set may be the index of the set's corresponding aggregate. Thus, the indexes for the aggregates may not be continuous, and an aggregate (if available) may be located by providing the index of an episode having the same starting time. Alternatively, aggregates may be indexed sequentially, or by a sequentially increasing integer value divided by the number of episodes in each set (for example, dividing the number of days since Jan. 1, 1970, by three).

Likewise, server 101 may also be configured to determine and store one or more sequences of higher level aggregate values. Each higher level aggregate may include values from an equal number of lower level aggregates and/or episodic values. A base number may be used to define the number of values aggregated at any particular level. For example, each aggregate in a sequence of first level aggregates may aggregate a number of consecutive episodes equal to the base number, each second level aggregate in a sequence of second level aggregates may aggregate a number of consecutive first level aggregates equal to the base number, and so on. In one aspect, the aggregation process may continue until it is no longer possible to create an aggregate using the base number, or the aggregation would exceed the range of the stored data (that is, the aggregation may not aggregate beyond, for example, the stored episodic values).

Figure 2:
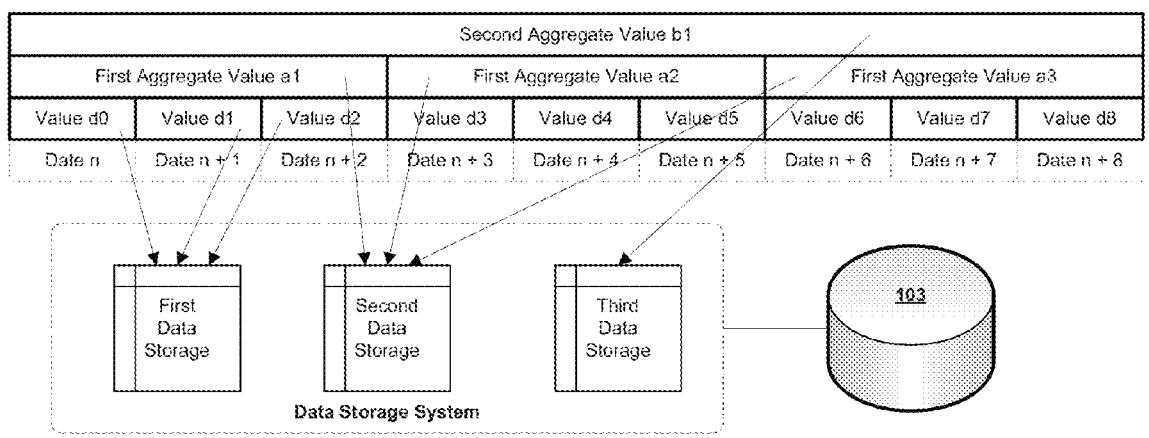
FIG. 2 is a diagram illustrating an exemplary aggregation and storage of web analytics data according to one aspect of the subject technology.

FIG. 2 is a diagram illustrating an exemplary aggregation and storage of web analytics data according to one aspect of the subject technology. In the depicted example, database 103 stores three database tables, each table containing a sequence of values. A first table 201 stores a value (for example, an impression count) for each of the previously described consecutive episodes. Row 202 illustrates a series of episodic values 203 stored in first table 201, each of the episodic values 203 being associated with a respective index 204; in this example, a (predetermined interval equal to a single day. In the depicted example, each index 204 of row 202 is determined from a starting time n, with each value $d_i$ corresponding to an index n+i. Where each date may be represented by an increasing integer value, n may be set at 0 to represent Jan. 1, 1970, and i may be equal to the number of days since Jan. 1, 1970.

In the depicted example, row 205 represents a sequence of first level aggregate values 207 stored in a second table 206. According to a base number of three, each of the first level aggregates 207 may aggregate a respective set of three consecutive episodic values 203 from row 202. Row 208 represents a sequence of second level aggregates 209 stored in a third table 210. Each of the second level aggregate values 209 may aggregate a respective set of first level aggregate values 207. In this example, the second level aggregate values 209 aggregate 3 first level aggregates 207, equating to nine episodic values 203 for each second level aggregate 209.

As described previously, an index 204 corresponding to an aggregate may be the same as the first episodic value 203 included in the aggregate. For example, first aggregate a2 may have a starting index equal to n+3 (the numerical representation of the date for episodic value d3). Thus, the index of an aggregate starting on day $d_i \epsilon D: \{d_0, d_1, d_2 \ldots d_q\}$ may have the same index as the episodic value corresponding to index n+1 ($0 \leq i \leq q$). Alternatively, each aggregate may be indexed by a number corresponding to an incremental date value divided by the base number raised to the power of the level of the aggregate (for example, a second level aggregate may be indexed by the number of days since Jan. 1, 1970, divided by nine).

On receiving a request to provide an aggregated value over a selected period (for example, a range of days), server 101 may be configured to determine a combination of episodic values $E_n$ and/or higher level aggregate values $A_m$ (for example, first level aggregate values) to generate the requested aggregated value. Where the selected period starts at index n+i and is j in length (that is, from n+i to n+i+j), the highest level aggregate $A_m$ for example, a second level aggregate) that starts at index n+i and whose span $S_A \leq j$ is retrieved. The process is then repeated for the next index not aggregated (starting at n+i+$S_A$+1). If the same level of aggregate cannot be used without exceeding the span of the selected period then a lower level aggregate (for example, a first level aggregate) may be used. If the span of all aggregates at any level is >j then one or more single episodic values $E_{n+i}$ may be selected (for example, at index n+i) to complete a span equal to j. It is not necessary that an aggregate be selected first. In other aspects, for example, wherein an aggregate cannot be found that starts at n+i, one or more single episodic values $E_{n+i}$ may be selected first. Accordingly, a number of aggregates $A_m$ and/or episodes $E_n$ are determined to span the entire period of j such that:

$$\Sigma S_{A_m} + \Sigma(1)_{E_n} = j \quad (1)$$

In the example of FIG. 2, episodic values are sequentially ordered and mutually exclusive from each other; and, no single episodic value is included in more than one first aggregate value, no first aggregate value is included in more than one second (and/or higher level) aggregate value, and so on.

By the same token, no aggregate $A_m$ aggregates the same episodic value $E_n$ as another aggregate, and no higher level aggregate aggregates the same lower level aggregate or episodic value as another higher level aggregate, and so on.

Once determined, the aggregate values and/or episodic values are retrieved and summed together to generate a requested value R. Thus, from equation (1), it follows that the requested value R may be generated according to the equation:

$$R = \Sigma A_m + \Sigma E_n \tag{2}$$

In one example, on receiving a request to provide an impression count for a date range, the largest aggregate starting on the first date of the range and not exceeding the requested date range is retrieved from database server 102, followed by the largest aggregate starting on the next date following the range of the previous aggregate and not exceeding the requested date range, and so on, until all the dates in the date range have been read. For example, to read a date range of twenty days using first level aggregates of three days and second level aggregates of nine days, and wherein a second level aggregate starts on the first date in the date range, the system will read two second level aggregates (for example, for the first eighteen days) and two episodic values (for example, for days 19 and 20).

In another aspect, server 101 may be configured to generate the total impression count by reading a first aggregate large enough to include all of the dates in the selected date range, and then subtract any lower level aggregates and/or single episodic values included in the first aggregate that are not included in the requested data range. For example, to read a date range of seventeen days using second level aggregates of nine days where a second level aggregate starts on the first date in the date range, the system may read two second level aggregates (for example, for the first eighteen days), and then subtract one episodic value (for example, for day 18 not included in the requested seventeen days).

In further aspects, server 101 may determine the level of aggregation used to determine the total impression count for a selected range as a function of a modulus. For example, server 101 may calculate the modulus of the span of the selected date range. In this regard, the calculation may include a divisor of the modulus equal to the base number raised to the power of a level of aggregation to be used. Using a divisor equal to the base number raised to the power of one (for example, three) may determine the possibility of a first level aggregate being available, and using a divisor equal to the base number raised to the power of two (for example, nine) may determine the possibility of a second level aggregate being available. For example, in a calculation in accordance with FIG. 2, the base number is equal to three. Thus, a divisor of three (base number of three raised to the first power) determines whether one or more first level aggregates may be used, and a divisor of nine (base number of three raised to the second power) determines whether one or more second level aggregates may be used, and so on. In a further aspect, the remainder of the modulus calculation may determine and/or confirm the selected aggregation level. For example, using first level aggregates, a remainder equal to zero may determine that an even number of first level aggregates (aggregating a number equal to the divisor) may be used to calculate the returned value. A remainder greater than zero but less than the span of the requested period may determine that at least one first level aggregate may be used in combination with a number of episodic values equal to the remainder.

In one example, if the selected date range spans date n to n+11 (twelve episodes) the system may begin calculating the total aggregated value by retrieving a second level aggregate having span $S_A$ at index n+i ($0 \le i \le 12$) such that $i+S_A$ is $\le 12$ (that is, starting index+span date$\le$range). If there is no such second level aggregate available then the process can be restarted using first level aggregates. The levels of aggregation and number of episodes may be determined by starting with a divisor raised to the power of 2; that is, a divisor of 9. Since 12 mod 9 equals 3 it can be determined that a second level aggregate may be used (the power of 2 specifying the second level). If a second level aggregate is available at an index of n+0 then the remainder of the modulus from the previous calculation may be used to determine a first level aggregate (the next lowest level). The calculation of 3 mod 3 equals 0 and therefore determines a first level aggregate may also be used, and, since the remainder is 0, no further aggregation or episodic values are needed. In another example, if the selected date range spans an index of n to n+7 (8 episodes) then the same modulus calculation 8 mod 3) will result in a remainder of 2, confirming that at least one first level aggregate (having a base number of 3) may be used, and that two episodic values may also be included in the calculation. In another aspect, the result of dividing the selected period by the divisor of the modulus calculation may determine the number of aggregates to use in determining the requested value. For example, for a date range of eight episodes and a divisor of 3, two first level aggregates may be used (for example, 8 divided by 3 raised to the power of 1). One skilled in the art will appreciate that either division or modulus can be calculated in any order (for example, performing division then taking the modulus of the date range).

In some aspects, server 101 is configured to determine a combination of episodic values and/or aggregates (for example, first or second or higher aggregate levels) that are retrieved from database 103. In other aspects, database server 102 may be configured to determine (for example, via stored procedures and/or other programmed configurations) the combination of episodic values and/or aggregates that are retrieved. In either case, it is the object of the subject technology that, once the number of first and/or second level aggregates and/or single episodic values are determined, each data storage storing the aggregate values and/or episodic values may be read in a parallel operation. Once the episodic values and aggregates are determined, database server 102 may return (for example, from database 103) the individual episodic and/or aggregate values to server 101 for calculation of the requested value by server 101, or, in some cases, return the calculated requested value to server 101.

The subject technology may implement aggregation using a base 3 algorithm as previously described, or another base number. The subject technology, however, is not limited to any particular base number value, and the base number may vary from system to system. In one aspect, a based number used in the algorithm may be selected by selecting a first base number and performing one or more predetermined data retrievals using the subject technology at the first base number. The one or more predetermined data retrievals may then be repeated using different base numbers. As a result, the base number to be used may be selected based on performance. A base 2 system of aggregation according to one aspect of the subject technology, for example, may include 1-day aggregates, 2-day aggregates, 4-day aggregates, 8-day aggregates, and so on. One scenario may read from a single row of values, producing a result with complexity O(n). A lower performing scenario (for example, the highest number of rows of aggregation read compared to the size of the period requested) may include a request for a specific range of $(2^N - 2)$ days. This scenario would require a read of $2*(N-1)$ rows of aggregation, effectively reducing the performance complexity from O(N) to O(log 2(N)). For example, for a 1 year+2 month request, data from up to 12 different data sources may be required.

One example of an algorithm used in a base 2 system of aggregation may include the following steps:

1) Define the maximum aggregate which may be included in the selected date range, $$result1=2^{\wedge}(floor(log\ 2(number\_days))) \quad (3)$$

2) Determine whether an aggregate of the size defined in step 1 fits in the selected date range.

$$result2=(last\_day\ mod\ result1)<(number\_days-result1) \quad (4)$$

3) if result2 is FALSE (doesn't fit) then divide result1 by 2. (5)

4) Find the fitting result1.
5) For each side of the fitted area, increasing and decreasing dates, server 101 determines whether the aggregate of half the size of the previously tested aggregate fits or not.

Figure 3:
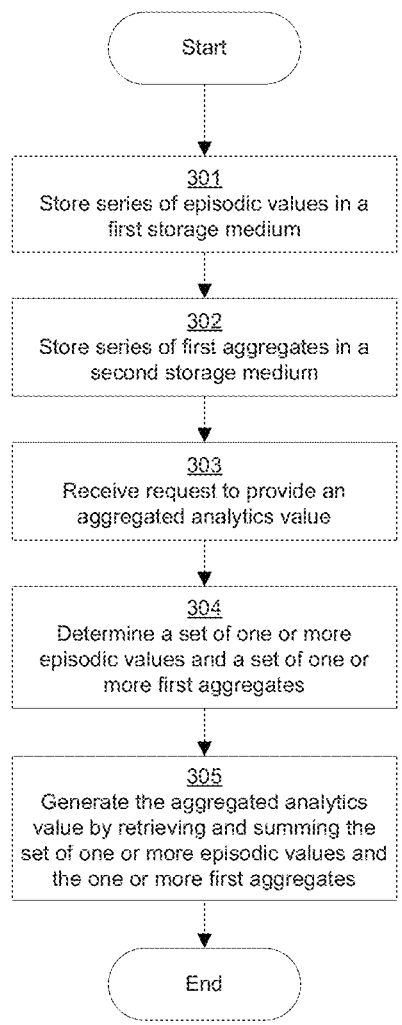
FIG. 3 is a flowchart illustrating a process for determining an aggregated web analytics value according to one aspect of the subject technology.

FIG. 3 is a flowchart illustrating a process for determining an aggregated web analytics value according to one aspect of the subject technology. In some aspects, the aggregated web analytics value may be a count of the total advertisement impressions generated for an online ad campaign on one or more websites. However, one skilled in the art will recognize that other types of analytics may be stored without departing from the scope of the subject technology.

In step 301, a series of episodic values is stored in a first data storage, each of the episodic values being associated with a respective predefined time interval (for example, a single day). In one aspect, each episodic value may be a count of advertisement impressions generated for an online ad campaign on one or more websites for its respective time interval. As described previously, the episodic values may be transmitted to server 101 from remote server 109. Server 101 may send one or more commands to database server 102 to store and/or update one or more of the episodic values in database 103 for any particular time interval in conjunction with receiving the value and/or increment from server 109. In step 302, a sequence of first level aggregate values is stored in a second data storage (for example, another database table), each of the first level aggregate values aggregating a respective set of consecutive episodic values.

In step 303, server 101 receives a request (for example, from a remote computer or terminal) to provide the aggregated web analytics value for a selected range of the predefined time intervals. In conjunction with receiving the request, in step 304, server 101 (and/or database server 102) determines a set of one or more episodic values that satisfy the selected range and a set of one or more first level aggregate values within the selected range. It is not necessary that the determination take place entirety on server 101. In some aspects, the determination may be made in conjunction with database server 102 (for example, using stored procedures or other database programming techniques). As described previously, the determined set of one or more episodic values may not be included in the determined set of one or more first level aggregate values. The number of episodic values and/or aggregates described herein, and/or combinations thereof, may be determined by any of the previously described processes and/or algorithms. The subject technology is not limited to any one of the described processes and/or algorithms. One skilled in the art reading this disclosure will recognize that there are many variations of the previously described processes and/or algorithms capable of generating the number and/or combination of episodic values and/or aggregates used to determine the requested aggregated web analytics value.

In step 305, server 101 (and/or database server 102) generates the aggregated web analytics value by retrieving and summing the determined set of one or more episodic values from the first data storage and the determined set of one or more first level aggregate values from the second data storage. In one aspect, server 101 may issue commands to database server 102 to query database 103, including its database tables storing the determined sets. In one aspect, database server 102 may return the individual values to server 101, and server 101 may combine and/or sum the values to produce the requested aggregated web analytics value. In other aspects, database server 102 may perform the processing of the individual values and return the requested aggregated web analytics value to server 101. It should be understood that each sequence of episodic or aggregate values may be stored in a different respective data storage and the retrieval of the values performed in one or more parallel operations. Each data storage may include one or more tables in database 103, or may include one or more tables stored on more than one database and/or database servers. It should also be understood that the term database is not meant to limit the subject technology to a relational database systems, but, rather, may also include object database systems, flat file systems, hyper-media databases, memory-mapped systems, hybrid database systems, or any other structured system suitable for storing data and values (for example, a modified director server).

Figure 4:
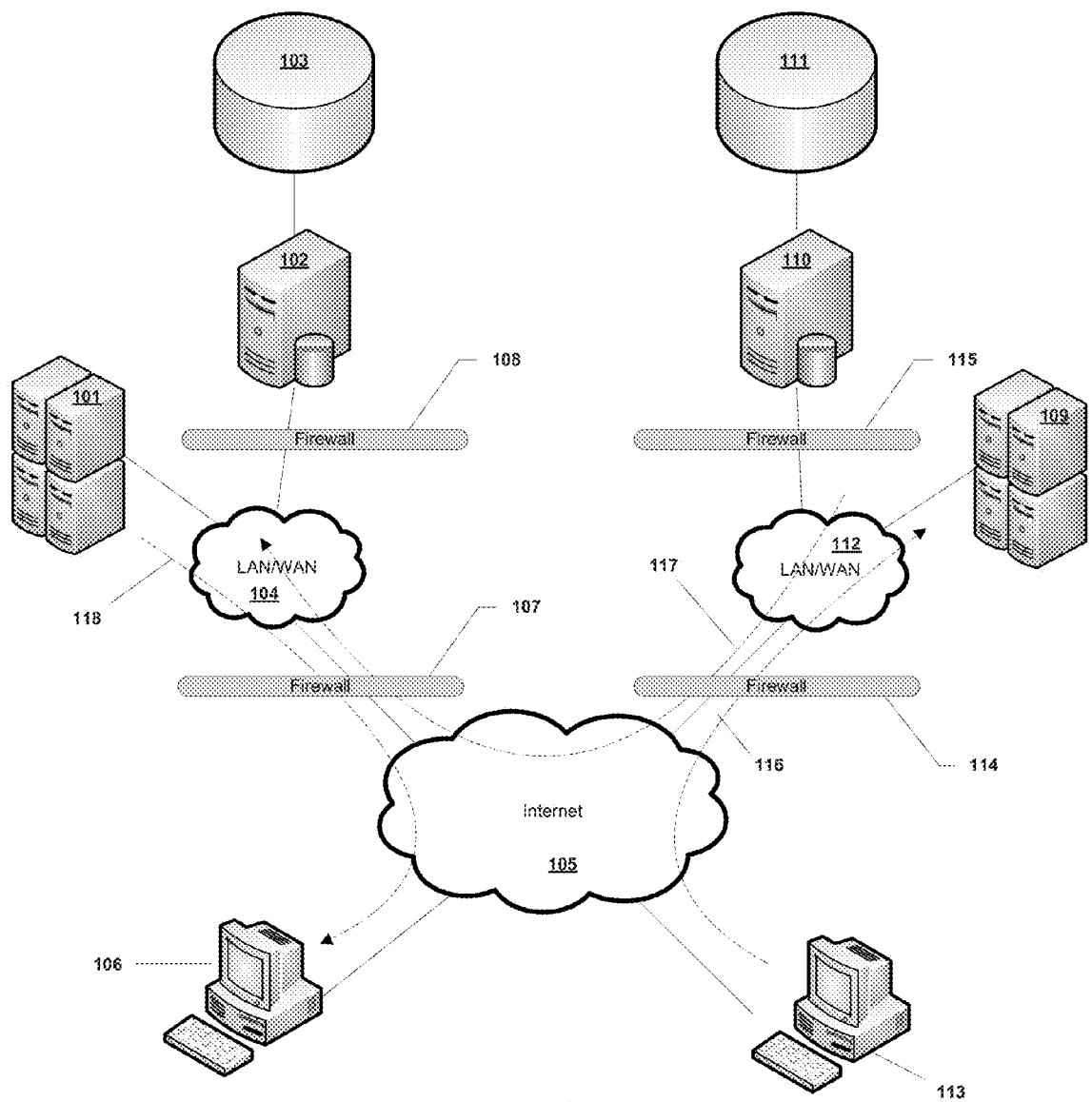
FIG. 4 is a diagram illustrating an exemplary communication between a web reporting system and a web analytics system, including client machines, according to one aspect of the subject technology.

FIG. 4 is a diagram illustrating an exemplary communication between a web reporting system and a web analytics system, including client machines, according to one aspect of the subject technology. In some aspects, the subject technology may include a local server 401 (for example, server 101, or a group of servers) in communication with a database server 402 (for example, database server 102, or a group of database servers) hosting a database 403 (for example, database 103). Local server 401 and database server 402 may be connected to and/or communicate with each other via a private local area network (or wide area network) 404. Local server 401 may be further connected via the Internet 405 to a first computer 406 (for example, a personal computer). A firewall 407 may exist between Internet 105 and local server 401, database server 402, and LAN/WAN 404. A secondary firewall 108 may exist between local server 401 and database server 402 to provide further security from threats arising via Internet 105.

In further aspects, the system may also include a remote server 409 (or group of servers) in communication with a remote database server 410 (or group of database servers) hosting a remote database 411. Remote server 409 and remote database server 410 may be connected to and/or communicate with each other via a remote private LAN/WAN 412. Remote server 409 may be further connected via Internet 405 to a second computer 413 (for example, a personal computer). A firewall 414 may exist between Internet 405 and local server 409, database server 410, and LAN/WAN 412. A secondary firewall 415 may also exist between local server 409 and database server 410 to provide further security from threats arising via Internet 405.

Remote server 409 may be configured to serve one or more websites to computers connected to Internet 405. A website administrator may configure remote server 409 to report web analytics, including website traffic, for a particular website to local server 401, by configuring the website with software reporting code that may be executed when the website is served by local server 409. For example, when computer 413 connects 416 to remote server 409 to view the configured website, the reporting code may make a procedural call 417 to local server 401 to report that the website was viewed. In one aspect, procedural call 417 may take the form of a request made by a JavaScript program on the configured website to increment database 403, or to view a webpage or image on local server 401. In one aspect, procedural call 417 may be an asynchronous transmission (for example, AJAX). Local server may interpret procedural call 417 as a numerical increment, wherein local server 401 will increment an episodic value associated with the website for a predefined time interval. The time interval may be, for example, the day and/or time on which procedural call 417 was made or received. It is to be understood that the time interval may include other times intervals, for example, an exact time, an hour, minute, week, month, or the like. In some aspects, receiving the numerical increment by local server 401 may include generating a numerical increment to represent the received procedural call 417 (for example, keep its own running count of times procedural call 417 accessed local server 401 and/or one of its web pages). In one aspect, in conjunction with receiving (and/or generating) the numerical increment, server 401 may instruct database server 402 to increment the proper episodic value by the numerical increment. In further aspects, the subject technology may be modified such that procedural call 417 includes the episodic value to be stored by database server 402.

A marketing administrator using local computer 406 may wish to view a report of episodic values, for example, a report displaying a total number of advertisement impressions generated for an ad campaign on the one or more configured websites running on remote server 409. In this regard, server 401 may provide one or more reporting web pages for reporting a total number of impressions for each website for each selected period. Using the subject technology, server 401 determines the aggregates for the selected period, accesses database server 402, generates the aggregated number of impressions, and returns 418 the value to computer 406 via a web browser or other suitable viewing mechanism. It is not necessary that the subject technology store only aggregate values based on time intervals or periods. It should be understood that episodic values and associated aggregates may be stored based on, or indexed by, other relevant reporting factors, for example, by geographic region, user demographic, and the like. The one or more reporting web pages may include graphic buttons for changing the report based on the relevant reporting factors and/or selected date/time ranges. Using the subject technology, an administrator may change the report based on selected date ranges, and or other reporting factors, and server 401 may determine and/or retrieve a combination of episodic and/or aggregate values to quickly return the requested reports in near real time.

Figure 5:
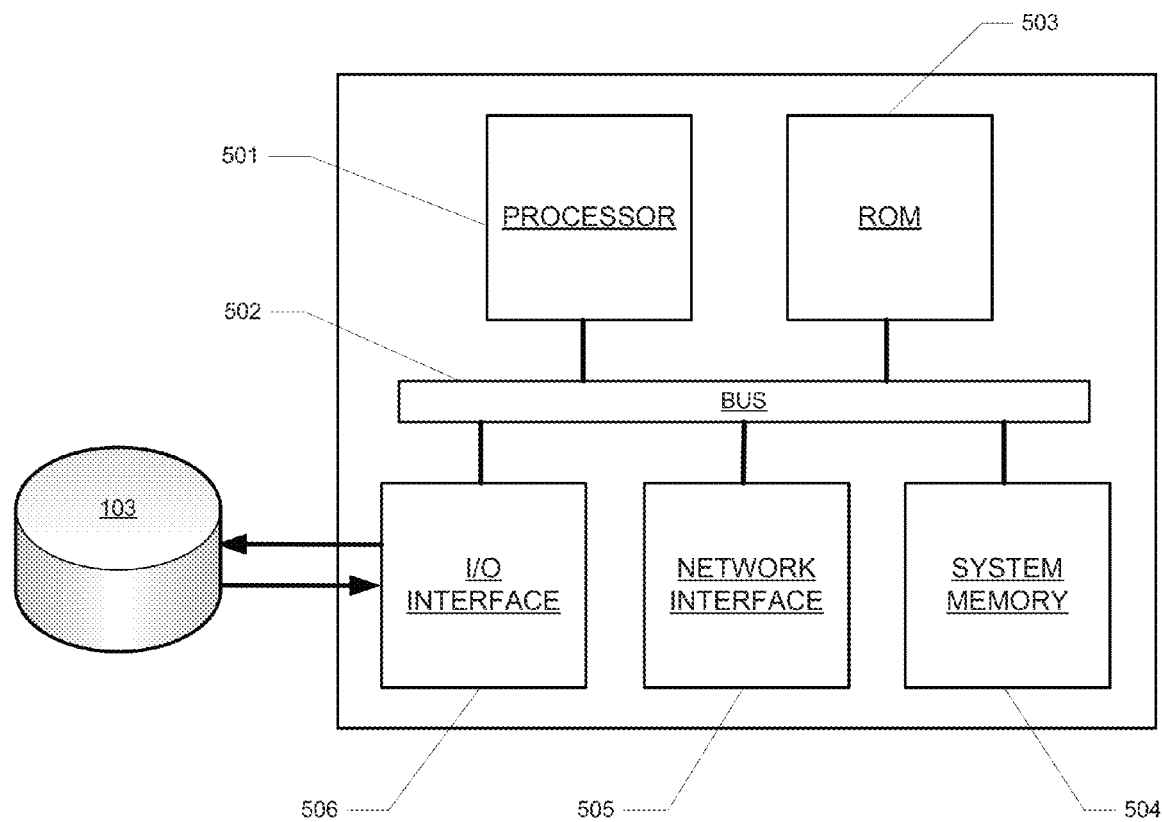
FIG. 5 is a diagram illustrating an exemplary server system for determining an aggregated web analytics value, including a processor and other internal components, according to one aspect of the subject technology.

FIG. 5 is a diagram illustrating an exemplary server system for determining an aggregated web analytics value, including a processor and other internal components, according to one aspect of the subject technology. As depicted in FIG. 5, in some aspects, server 500 (for example, server 401 or 409, and/or database server 402 or 410, respectively) includes several internal components such as a processor 501, a system bus 502, read-only memory 503, system memory 504, network interface 505, I/O interface 506, and the like. In one aspect, processor 501 may also be communication with a storage medium 507 (for example, a hard drive) via I/O interface 506. In some aspects, all of these elements of server 500 may be integrated into a single server. In other aspects, these elements may be configured as separate components.

Processor 501 may be configured to execute code or instructions to perform the operations and functionality described herein, manage request flow and address mappings, and to perform calculations and generate commands. Processor 501 is configured to monitor and control the operation of the components in server 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from system memory 505, ROM 503, or received from a storage medium 507 (for example, via I/O interface 506). ROM 503, system memory 505, and storage medium 507 represent examples of machine or computer readable media on which instructions/code may be executable by processor 501. Machine or computer readable media may generally refer to any medium or media used to provide instructions to processor 501, including both volatile media, such as dynamic memory used for system memory 504 or for buffers within processor 501, and non-volatile media, such as electronic media, optical media, and magnetic media.

In some aspects, processor 501 is configured to communicate with one or more external devices (for example, via I/O interface 506). Processor 501 is further configured to read data stored in system memory 504 and/or storage medium 507 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like. Alternatively, one or more external devices may include an electronic device such as a digital camera, a digital audio player, a digital video recorder, and the like.

In some aspects, system memory 504 represents volatile memory used to temporarily store data and information used to manage server 500. According to one aspect of the subject technology, system memory 504 is random access memory (RAM) such as double data rate (DDR) RAM. Other types of RAM also may be used to implement system memory 504. Memory 504 may be implemented using a single RAM module or multiple RAM modules. While system memory 504 is depicted as being part of server 500, those skilled in the art will recognize that system memory 504 may be separate from server 500 without departing from the scope of the subject technology. Alternatively, system memory 504 may be a non-volatile memory such as a magnetic disk, flash memory, peripheral SSD, and the like.

I/O interface 506 may be configured to be coupled to one or more external devices, to receive data from the one or more external devices and to send data to the one or more external devices. I/O interface 506 may include both electrical and physical connections for operably coupling I/O interface 506 to processor 501, for example, via the bus 502. I/O interface 506 is configured to communicate data, addresses, and control signals between the internal components attached to bus 502 (for example, processor 501) and one or more external devices (for example, a hard drive). I/O interface 506 may be configured to implement a standard interface, such as Serial-Attached SCSI (SAS), Fiber Channel interface, PCI Express (PCIe), SATA, USB, and the like. I/O interface 506 may be configured to implement only one interface. Alternatively, I/O interface 506 may be configured to implement multiple interfaces, which are individually selectable using a configuration parameter selected by a user or programmed at the time of assembly. I/O interface 506 may include one or more buffers for buffering transmissions between one or more external devices and bus 502 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer implemented method of determining an aggregated web analytics value, comprising:
   storing in a first data storage medium a series of episodic values, each of the episodic values being associated with a respective predefined time interval;
   storing in a second data storage medium a sequence of first level aggregate values, each of the first level aggregate values aggregating a respective set of consecutive episodic values; and
   receiving a request to provide the aggregated web analytics value from a selected range of the predefined time intervals;
   determining, in response to the receiving, a set of one or more episodic values within the selected range and a set of one or more first level aggregate values within the selected range, wherein a first period of time for the determined set of one or more episodic values is not included in a second period of time for the determined set of one or more first level aggregate values; and
   generating, using one or more computers, the aggregated web analytics value by retrieving and summing the determined set of one or more episodic values from the first data storage medium and the determined set of one or more first level aggregate values from the second data storage medium.

2. The computer implemented method of claim 1, wherein each of the first level aggregate values aggregates an equal number of the consecutive episodic values.

3. The computer implemented method of claim 2, wherein the equal number is a base value, the method further comprising:

providing a number of sequences of higher level aggregate values, wherein each higher level aggregate value in a sequence of higher level aggregate values aggregates a number of lower level aggregate values equal to the base value.

4. The computer implemented method of claim 3, wherein the number of sequences is equal to a maximum number at which an additional sequence of higher level aggregate values cannot be created using the base value.

5. The computer implemented method of claim 3, further comprising:
storing each sequence of higher level aggregate values in a different respective data storage medium.

6. The computer implemented method of claim 5, further comprising:
on receiving the request to provide the aggregated web analytics value, determining a set of one or more higher level aggregate values within the selected range, wherein the determined set of one or more episodic values or the determined set of one or more first level aggregate values is not included in the determined set of one or more higher level aggregate values, and wherein generating the aggregated web analytics value includes also retrieving and summing the set of one or more higher level aggregate values from the different storage medium.

7. The computer implemented method of claim 1, wherein each of the episodic values includes a count of advertisement impressions generated for an online ad campaign on one or more websites.

8. The computer implemented method of claim 1, wherein storing in a first data storage medium a series of episodic values comprises:
receiving at a local server from a remote server a numerical increment associated with one of the respective predefined time intervals; and
incrementing one of the episodic values in the series of episodic values by the numerical increment, wherein the episodic value incremented is associated with the one of the respective predefined time intervals.

9. The computer implemented method of claim 1, wherein the set of one or more episodic values and the set of one or more first level aggregate values are retrieved from the first and second storage mediums by parallel operations.

10. The computer implemented method of claim 1, wherein each first aggregate value is a sum of its respective set of consecutive episodic values.

11. The computer implemented method of claim 1, wherein the first data storage medium is a first table in a database and the second data storage medium is a second table in the database.

12. The computer implemented method of claim 1, wherein the first level aggregate values are retrieved such that, when the first level aggregate values chronologically ordered, the second period of time does not exceed the selected range of the predefined time intervals, and wherein the episodic values are retrieved such that summing the first period of time and the second period of time corresponds to the selected range of the predefined time intervals.

13. The computer implemented method of claim 1, wherein each of the first level aggregate values aggregates a based number of the consecutive episodic values, and wherein a number of the episodic values retrieved is equal to a modulus of the selected range divided by the base number.

14. A non-transitory machine-readable storage medium including stored machine-executable instructions for performing a method of determining an aggregated web analytics value, the method comprising:
storing in a first data storage medium a series of episodic values, each of the episodic values being associated with a respective predefined time interval;
storing in a second data storage medium a sequence of first level aggregate values, each of the first level aggregate values aggregating a respective set of consecutive episodic values; and
receiving a request to provide the aggregated web analytics value from a selected range of the predefined time intervals;
determining, in response to the receiving, a set of one or more episodic values within the selected range and a set of one or more first level aggregate values within the selected range, wherein a first period of time for the determined set of one or more episodic values is not included in a second period of time for the determined set of one or more first level aggregate values; and
generating the aggregated web analytics value by retrieving and summing the determined set of one or more episodic values from the first data storage medium and the determined set of one or more first level aggregate values from the second data storage medium.

15. The non-transitory machine-readable storage medium of claim 14, wherein each of the first level aggregate values aggregates an equal number of the consecutive episodic values.

16. The non-transitory machine-readable storage medium of claim 15, wherein the equal number is a base value, the method further comprising:
providing a number of sequences of higher level aggregate values, wherein each higher level aggregate value in a sequence of higher level aggregate values aggregates a number of lower level aggregate values equal to the base value.

17. The non-transitory machine-readable storage medium of claim 16, the method further comprising:
storing each sequence of higher level aggregate values in a different respective data storage medium.

18. The non-transitory machine-readable storage medium of claim 17, the method further comprising:
on receiving the request to provide the aggregated web analytics value, determining a set of one or more higher level aggregate values within the selected range, wherein the determined set of one or more episodic values or the determined set of one or more first level aggregate values is not included in the determined set of one or more higher level aggregate values, and wherein generating the aggregated web analytics value includes also retrieving and summing the determined set of one or more higher level aggregate values from the different storage medium.

19. The non-transitory machine-readable storage medium of claim 14, wherein each of the episodic values includes a count of advertisement impressions generated for an online ad campaign on one or more websites.

20. The non-transitory machine-readable storage medium of claim 14, wherein storing in a first data storage medium a series of episodic values comprises:
receiving at a local server from a remote server a numerical increment associated with one of the respective predefined time intervals; and
incrementing one of the episodic values in the series of episodic values by the numerical increment, wherein the episodic value incremented is associated with the one of the respective predefined time intervals.

21. A system for determining an aggregated web analytics value, comprising:
- a first and a second data storage medium; and
- one or more processors operable to:
    - store in the first data storage medium a series of episodic values, wherein each of the episodic values is associated with a respective predefined time interval and includes a count of advertisement impressions generated for an online ad campaign on one or more websites;
    - store in the second data storage medium a sequence of first level aggregate values, each of the first level aggregate values aggregating a respective set of consecutive episodic values, wherein each set of consecutive episodic values is equal in number; and
    - receive a request to provide the aggregated web analytics value from a selected range of the predefined time intervals;
    - determine, in response to receiving the request, a set of one or more episodic values and a set of one or more first level aggregate values within the selected range, wherein a first period of time for the determined set of one or more episodic values is not included in a second period of time for the determined set of one or more first level aggregate values; and
    - generate the aggregated web analytics value by retrieving and summing the set of one or more episodic values from the first data storage medium and the set of one or more first level aggregate values from the second data storage medium.

22. The system of claim 21, the one or more processors further operable to:
- provide a number of sequences of higher level aggregate values, wherein each higher level aggregate value in a sequence of higher level aggregate values aggregates a number of lower level aggregate values equal to the base value.

23. The system of claim 22, the one or more processors further operable to:
- store each sequence of higher level aggregate values in a different respective data storage medium.

24. The system of claim 23, the one or more processors further operable to:
- on receiving the request to provide the aggregated web analytics value, determine a set of one or more higher level aggregate values within the selected range, wherein the determined set of one or more episodic values or the determined set of one or more first level aggregate values is not included in the determined set of one or more higher level aggregate values, and wherein the processor being operable to generate the aggregated web analytics value includes the processor being operable to retrieve and sum the set of one or more higher level aggregate values from the different storage medium.

25. The system of claim 21, further comprising:
- a local server,
- wherein the processor being operable to store in the first data storage medium a series of episodic values includes the processor being operable to:
- receive via the local server from a remote server a numerical increment associated with one of the respective predefined time intervals; and
- increment one of the episodic values in the series of episodic values by the numerical increment, wherein the episodic value incremented is associated with the one of the respective predefined time intervals.

* * * * *